US007381354B2

(12) United States Patent
Feske et al.

(10) Patent No.: US 7,381,354 B2
(45) Date of Patent: *Jun. 3, 2008

(54) FLAME RETARDANTS WITH HIGH HALOGEN CONTENT AND LOW VISCOSITY

(75) Inventors: Elbert F. Feske, Denham Springs, LA (US); Nelson E. Clark, Baton Rouge, LA (US); Arthur G. Mack, Prairieville, LA (US); Jeffrey Todd Aplin, Lexington, SC (US)

(73) Assignee: Albemarle Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/751,255

(22) Filed: May 21, 2007

(65) Prior Publication Data

US 2007/0225517 A1    Sep. 27, 2007

Related U.S. Application Data

(60) Division of application No. 10/849,680, filed on May 20, 2004, now Pat. No. 7,258,823, which is a continuation-in-part of application No. 10/651,823, filed on Aug. 29, 2003, now Pat. No. 7,045,564.

(51) Int. Cl.
*C09K 21/08* (2006.01)

(52) U.S. Cl. ............... 252/609; 560/79; 560/83; 560/91; 560/92; 560/93; 560/98

(58) Field of Classification Search ............... 252/609; 560/79, 83, 91–93, 98
See application file for complete search history.

(56) References Cited

U.S. PATENT DOCUMENTS

| 3,089,863 A | 5/1963 | Hicks et al. |
| 3,374,208 A | 3/1968 | Seiner et al. |
| 3,455,886 A | 7/1969 | Versnel |
| 3,519,700 A | 7/1970 | Baum |
| 3,585,185 A * | 6/1971 | Levis, Jr. et al. ......... 536/18.2 |
| 3,642,724 A | 2/1972 | Schmidt et al. |
| 3,676,376 A | 7/1972 | Svoboda et al. |
| 3,875,183 A | 4/1975 | Papa et al. |
| 3,929,866 A | 12/1975 | Baldino et al. |
| 3,974,109 A | 8/1976 | Papa et al. |
| 3,989,653 A | 11/1976 | Baldino et al. |
| 4,069,212 A | 1/1978 | Fletcher et al. |
| 4,098,704 A | 7/1978 | Sandler |
| 4,144,395 A | 3/1979 | Murphy et al. |
| 4,209,609 A | 6/1980 | Haas |
| 4,264,745 A | 4/1981 | Foucht |
| 4,303,767 A | 12/1981 | Newkirk et al. |
| 4,307,205 A | 12/1981 | Bershas |
| 4,405,725 A | 9/1983 | Bernard et al. |
| 4,468,481 A | 8/1984 | Barda et al. |
| 4,468,482 A | 8/1984 | Barda et al. |
| 4,564,697 A | 1/1986 | Sutker |
| 4,764,550 A | 8/1988 | Lovenguth |
| 4,912,158 A | 3/1990 | Bohen et al. |
| 4,923,916 A | 5/1990 | Bohen et al. |
| 4,923,917 A | 5/1990 | Bohen |
| 4,938,894 A | 7/1990 | Bohen et al. |
| 4,954,542 A | 9/1990 | Bohen et al. |
| 5,049,697 A | 9/1991 | Bohen et al. |
| 5,102,919 A | 4/1992 | Swab |
| 5,102,923 A | 4/1992 | Porosoff et al. |
| 5,114,985 A | 5/1992 | Kuyzin et al. |
| 5,332,859 A | 7/1994 | Tarbit |
| 5,907,014 A | 5/1999 | Quint |
| 6,218,074 B1 | 4/2001 | Dueber et al. |

FOREIGN PATENT DOCUMENTS

| EP | 0386406 B1 | 5/1995 |
| GB | 2034726 A1 | 6/1980 |
| WO | WO 03060000 A1 | 7/2003 |

OTHER PUBLICATIONS

Encyclopedia of Polymer Science and Technology, vol. 11, Plastics, Resins, Rubbers, Fibers, John Wiley & Sons, Inc., 1969, pp. 506-563.

(Continued)

*Primary Examiner*—Peter Szekely
(74) *Attorney, Agent, or Firm*—Jeremy J. Kliebert

(57) ABSTRACT

Flame retardant formulations comprised of at least one bromine-containing polyol are produced by a process which comprises:

A) heating a mixture formed from components comprised of (i) tetrabromophthalic anhydride, (ii) at least one aliphatic polyol, and (iii) at least one liquid straight chain aliphatic diester of a straight-chain alkane dicarboxylic acid to form an intermediate composition; and B) contacting all or a portion of the intermediate composition one or more times with (iv) at least one alkylene oxide that results in the formation of a liquid product formulation, and optionally, removing any excess alkylene oxide present;

the amounts of (i), (ii), (iii), and (iv) used being proportioned to form a formulation having a bromine content of at least about 40 wt %, a viscosity at 25° C. of about 20,000 cps or less, and an acid number as determinable by aqueous sodium hydroxide titration and expressed in terms of potassium hydroxide, of less than about 1 milligram of KOH per gram of the formulation.

14 Claims, 1 Drawing Sheet

OTHER PUBLICATIONS

Encyclopedia of Polymer Science and Technology, vol. 15, Plastics, Resins, Rubbers, Fibers, John Wiley & Sons, Inc., 1969, pp. 445-479.

Pape, Peter G, et al., "Tetrabromophthalic Anhydride in Flame-Retardant Urethane Foams", Journal of Cellular Plastics, Nov. 1968, pp. 438-442.

* cited by examiner

FLAME RETARDANTS WITH HIGH HALOGEN CONTENT AND LOW VISCOSITY

REFERENCE TO RELATED APPLICATIONS

This application is a division of commonly-owned application Ser. No. 10/849,680, filed May 20, 2004, now U.S. Pat. No. 7,258,823 which in turn is a continuation-in-part of commonly-owned application Ser. No. 10/651,823, filed Aug. 29, 2003, now U.S. Pat. No. 7,045,564, issued May 16, 2006.

TECHNICAL FIELD

This invention pertains to flame retardants that are suitable for use in polyurethanes and polyisocyanurates, and to methods for preparing such flame retardants and the use thereof in polyurethane and polyisocyanurate compositions.

BACKGROUND

Diester/ether diols of tetrabromophthalic anhydride are well known reactive flame retardants. See for example, U.S. Pat. No. 4,564,697 to B. J. Sutker. Such products can have bromine contents of 40 wt % or more. However they are viscous liquids with viscosities in the 80,000 to 200,000 cps range at 25° C., with 100,000 cps being typical. In order to pump such liquid products it is necessary to heat them to elevated temperatures. For example one commercial product with a viscosity at 25° C. in the range of 80,000 to 135,000 cps when heated to 60° C. will typically have a viscosity in the range of 1400 to 2100. To avoid the need for heating the product to reduce its viscosity, a commercially-viable reactive flame retardant product has been produced as a blend of diester/ether diol of tetrabromophthalic anhydride, polyol, and a liquid phosphate ester. Although this product has typical viscosities in the 6000 to 10,000 cps range at 25° C., its bromine content is reduced to a typical value of 36 wt %.

A need thus exists for polyols based on tetrabromophthalic anhydride which are effective as flame retardants, which have low viscosities at 25° C. (e.g., about 20,000 cps or less), which have high halogen contents (e.g., at least about 40 wt %), and which can be produced economically, and especially for efficacious process technology for producing such polyols.

SUMMARY OF THE INVENTION

Provided by this invention are (i) new flame retardant compounds and (ii) new flame retardant formulations that satisfy the foregoing need. Because of their high halogen contents and low viscosities, these new flame retardant compounds and new flame retardant formulations are particularly well suited for use in forming flame retardant polyurethanes and polyisocyanurates. This invention also includes process technology for preparing such flame retardants compounds and formulations on an economical basis, and in addition includes the use of such compounds and formulations in forming flame retardant polyurethane polymers, especially polyurethane foams, as well as flame retardant polyisocyanurate polymers and foams produced therefrom.

The process technology of this invention for preparing such flame retardants compounds and formulations on an economical basis involves a number of embodiments.

One such embodiment is a process of producing a flame retardant formulation comprised of at least one bromine-containing polyol, which process comprises:

A) heating a mixture formed from components comprised of (i) tetrabromophthalic anhydride, (ii) at least one aliphatic polyol, and (iii) at least one liquid straight chain aliphatic diester of a straight-chain alkane dicarboxylic acid to form an intermediate composition; and B) contacting all or a portion of the intermediate composition one or more times with (iv) at least one alkylene oxide that results in the formation of a liquid product formulation, and optionally, removing any excess alkylene oxide present;

the amounts of (i), (ii), (iii), and (iv) used being proportioned to form a formulation having a bromine content of at least about 40 wt %, a viscosity at 25° C. of about 20,000 cps or less, and an acid number as determinable by aqueous sodium hydroxide titration and expressed in terms of potassium hydroxide, of less than about 1 milligram of KOH per gram of the formulation.

Another embodiment is a process of producing a flame retardant formulation comprised of at least one bromine-containing polyol, which process comprises:

A) heating a mixture formed from components comprised of (i) tetrabromophthalic anhydride, (ii) at least one aliphatic polyol, and (iii) at least one liquid straight chain aliphatic diester of a straight-chain alkane dicarboxylic acid to form an intermediate composition;

B) contacting all or a portion of the intermediate composition one or more times with (iv) at least one alkylene oxide that results in the formation of a second intermediate composition, and optionally, removing any excess alkylene oxide present; and C) mixing with all or a portion of said second intermediate composition (v) at least one mono- or polyhalohydrocarbon and/or at least one mono- or polyhalocarbon, the viscosity of (v) being less than about 100 cps at 25° C. and the halogen content of (v) being one or more chlorine and/or bromine atoms per molecule;

the amounts of (i), (ii), (iii), (iv), and (v) used being proportioned to form a product formulation having a bromine content of at least about 40 wt %, a viscosity at 25° C. of about 20,000 cps or less, and an acid number as determinable by aqueous sodium hydroxide titration and expressed in terms of potassium hydroxide, of less than about 1 milligram of KOH per gram of the formulation.

A further embodiment is a process for producing at least one bromine-containing polyol, which process comprises:

A) heating at a temperature in the range of about 110° C. to about 140° C., a mixture formed from (i) tetrabromophthalic anhydride, (ii) diethylene glycol, and/or (iii) at least one alpha-omega alkane diol, or at least one alpha-omega alkane diol and at least one aliphatic monool, in proportions of about 0.1 to about 1.1 moles of (ii) per mole of (i), and about 0.1 to about 1.1 moles of (iii) per mole of (i) with a total of about 0.5 to about 1.8 moles of (ii) and (iii) per mole of (i) used in forming the mixture to form a reaction product, and optionally (iv) an inert solvent; and B) contacting at a temperature in the range of about 110° C. to about 140° C., in the optional presence of an inert solvent, reaction product formed in A) with at least one alkylene oxide proportioned to be in the range of about 1.2 to about 1.9 moles of alkylene oxide per mole of tetrabromophthalic anhydride used in forming the amount of reaction product used in B), with the reaction mixture under a pressure in the range of about 10 to about 100 psig, such that there is formed a bromine-containing polyol product mixture having, after optional removal of inert solvent if used, a bromine content of at least about 40 wt %, a viscosity at 25° C. of about 20,000 cps or less, and an acid number as determined by aqueous sodium hydroxide titration and expressed in terms of potassium hydroxide, of less than 1 milligram of KOH per gram of undiluted product.

A still further embodiment is a process of producing a flame retardant formulation comprised of at least one bromine-containing polyol, which process comprises mixing together:
1) a bromine-containing polyol made from reaction of (a) tetrabromophthalic anhydride and (b) an aliphatic polyol in proportions of 0.5 to 10 equivalents of (b) per equivalent of (a) to form an intermediate product, followed by reaction of intermediate product with (c) at least one epoxide in proportions of 0.5 to 20 equivalents of (c) per equivalent of (a) used in forming the amount of intermediate product being reacted with (c), and
2) at least one liquid straight chain aliphatic diester of a straight-chain alkane dicarboxylic acid;

such that the mixture formed from 1) and 2) has a bromine content of at least 40 wt % and a viscosity at 25° C. of about 20,000 cps or less.

Still another embodiment is a process of producing a flame retardant formulation comprised of at least one bromine-containing polyol, which process comprises mixing together:
1) at least one bromine-containing polyol made from
   A) reaction of (i) tetrabromophthalic anhydride (ii) diethylene glycol, and/or (iii) at least one alpha-omega alkane diol, or at least one alpha-omega alkane diol and at least one aliphatic monool, in proportions of about 0.1 to about 1.1 moles of (ii) per mole of (i), and about 0.1 to about 1.1 moles of (iii) per mole of (i) with a total of about 0.5 to about 1.8 moles of (ii) and (iii) per mole of (i) used in forming the mixture to form a reaction product, and optionally (iv) an inert solvent; and
   B) contacting at a temperature in the range of about 110° C. to about 140° C., in the optional presence of an inert solvent, reaction product formed in A) with at least one alkylene oxide proportioned to be in the range of about 1.2 to about 1.9 moles of alkylene oxide per mole of tetrabromophthalic anhydride used in forming the amount of reaction product used in B), with the reaction mixture under a pressure in the range of about 10 to about 100 psi, to form a bromine-containing polyol product mixture having, after optional removal of said inert solvent if used, a bromine content of at least about 40 wt % and having an acid number as determined by aqueous sodium hydroxide titration and expressed in terms of potassium hydroxide, of less than 0.4 milligrams of KOH per gram of undiluted product; and
2) at least one liquid straight chain aliphatic diester of a straight-chain alkane dicarboxylic acid;

such that the mixture formed from 1) and 2) has a bromine content of at least 40 wt % and a viscosity at 25° C. of about 20,000 cps or less.

Yet another embodiment is a process of producing a flame retardant formulation comprised of at least one bromine-containing polyol, which process comprises:
A) heating at a temperature in the range of about 110° C. to about 140° C. a mixture formed from (i) tetrabromophthalic anhydride, (ii) diethylene glycol, (iii) at least one alpha-omega alkane diol, or at least one alpha-omega alkane diol and at least one aliphatic monool, and (iv) at least one liquid straight chain aliphatic diester of a straight-chain alkane dicarboxylic acid, in proportions of about 0.1 to about 1.1 moles of (ii) per mole of (i), and about 0.1 to about 1.1 moles of (iii) per mole of (i) with a total of about 0.5 to about 1.8 moles of (ii) and (iii) per mole of (i) used in forming the mixture, to thereby form a reaction product in admixture with said at least one liquid straight chain aliphatic diester of a straight-chain alkane dicarboxylic acid as a solvent; and
B) contacting at a temperature in the range of about 110° C. to about 140° C., (i) reaction product formed in A) that is in admixture with said at least one liquid straight chain aliphatic diester of a straight-chain alkane dicarboxylic acid with (ii) at least one alkylene oxide proportioned to be in the range of about 1.2 to about 1.9 moles of alkylene oxide per mole of tetrabromophthalic anhydride used in forming the amount of reaction product used in B), with the reaction mixture under a pressure in the range of about 10 to about 100 psi, such that there is formed a bromine-containing polyol product mixture having a bromine content of at least about 40 wt %, a viscosity at 25° C. of about 20,000 cps or less, and an acid number as determined by aqueous sodium hydroxide titration and expressed in terms of potassium hydroxide, of less than about 0.5 milligrams of KOH per gram of undiluted product formulation.

Another embodiment is a process of producing a flame retardant formulation comprised of at least one bromine-containing polyol, which process comprises mixing together:
1) a bromine-containing polyol made from reaction of (a) tetrabromophthalic anhydride and (b) an aliphatic polyol in proportions of 0.5 to 10 equivalents of (b) per equivalent of (a) to form an intermediate product, followed by reaction of intermediate product with (c) at least one epoxide in proportions of 0.5 to 20 equivalents of (c) per equivalent of (a) used in forming the amount of intermediate product being reacted with (c);
2) at least one liquid straight chain aliphatic diester of a straight-chain alkane dicarboxylic acid; and
3) (X) at least one mono- or polyhalohydrocarbon in which the halogen content is one or more chlorine and/or bromine atoms per molecule, (Y) at least one mono- or polyhalocarbon in which the halogen content is made up of chlorine and/or bromine atoms, or (Z) both of (X) and (Y), with the proviso that each of (X), (Y), and (Z) has a viscosity of less about 100 cps at 25° C.;

such that the mixture formed from 1), 2), and 3) has a bromine content of at least 40 wt %, a viscosity at 25° C. of about 20,000 cps or less and an acid number as determined by aqueous sodium hydroxide titration and expressed in terms of potassium hydroxide, of less than about 0.5 milligrams of KOH per gram of undiluted product formulation.

A still further embodiment is a process of producing a flame retardant formulation comprised of at least one bromine-containing polyol, which process comprises mixing together:
1) at least one bromine-containing polyol made from
   A) reaction of (i) tetrabromophthalic anhydride (ii) diethylene glycol, and (iii) at least one alpha-omega alkane diol, or at least one alpha-omega alkane diol and at least one aliphatic monool, in proportions of about 0.1 to about 1.1 moles of (ii) per mole of (i), and about 0.1 to about 1.1 moles of (iii) per mole of (i) with a total of about 0.5 to about 1.8 moles of (ii) and (iii) per mole of (i) used in forming the mixture to form a reaction product, and optionally (iv) an inert solvent; and B) contacting at a temperature in the range of about 110° C. to about 140° C., in the optional presence of an inert solvent, reaction product formed in A) with at least one alkylene oxide proportioned to be in the range of about 1.2 to about 1.9 moles of alkylene oxide per mole of tetrabromophthalic anhydride used in forming the amount of reaction product used in B), with the reaction mixture under a pressure in the range of about 10 to about 100 psi, to form a bromine-containing polyol product mixture having a bromine content of at least about 40 wt % and having, after optional removal of inert solvent if used, an acid number as determined by aqueous sodium hydroxide titration and expressed in terms of potassium hydroxide, of less than 0.4 milligrams of KOH per gram of undiluted product;

2) at least one liquid straight chain aliphatic diester of a straight-chain alkane dicarboxylic acid; and 3) (X) at least one mono- or polyhalohydrocarbon in which the halogen content is one or more chlorine and/or bromine atoms per molecule, (Y) at least one mono- or polyhalocarbon in which the halogen content is made up of chlorine and/or bromine atoms, or (Z) both of (X) and (Y), with the proviso that each of (X), (Y), and (Z) has a viscosity of less about 100 cps at 25° C.;

such that the mixture formed from 1), 2), and 3) has a bromine content of at least 40 wt % and a viscosity at 25° C. of about 20,000 cps or less.

Still another embodiment is a process of producing a flame retardant formulation comprised of at least one bromine-containing polyol, which process comprises mixing together:

1) a bromine-containing polyol product mixture formed by a process which comprises:

A) heating at a temperature in the range of about 110° C. to about 140° C. a mixture formed from (i) tetrabromophthalic anhydride, (ii) diethylene glycol, (iii) at least one alpha-omega alkane diol, or at least one alpha-omega alkane diol and at least one aliphatic monool, and (iv) at least one liquid straight chain aliphatic diester of a straight-chain alkane dicarboxylic acid, in proportions of about 0.1 to about 1.1 moles of (ii) per mole of (i), and about 0.1 to about 1.1 moles of (iii) per mole of (i) with a total of about 0.5 to about 1.8 moles of (ii) and (iii) per mole of (i) used in forming the mixture, to thereby form a reaction product in admixture with said at least one liquid straight chain aliphatic diester of a straight-chain alkane dicarboxylic acid as a solvent; and B) contacting at a temperature in the range of about 110° C. to about 140° C., (i) reaction product formed in A) that is in admixture with said at least one liquid straight chain aliphatic diester of a straight-chain alkane dicarboxylic acid with (ii) at least one alkylene oxide proportioned to be in the range of about 1.2 to about 1.9 moles of alkylene oxide per mole of tetrabromophthalic anhydride used in forming the amount of reaction product used in B), with the reaction mixture under a pressure in the range of about 10 to about 100 psi, such that there is formed a bromine-containing polyol product mixture having a bromine content of at least about 40 wt %, a viscosity at 25° C. of about 20,000 cps or less, and an acid number as determined by aqueous sodium hydroxide titration and expressed in terms of potassium hydroxide, of less than about 0.5 milligrams of KOH per gram of undiluted product formulation; and 2) (X) at least one mono- or polyhalohydrocarbon in which the halogen content is one or more chlorine and/or bromine atoms per molecule, (Y) at least one mono- or polyhalocarbon in which the halogen content is made up of chlorine and/or bromine atoms, or (Z) both of (X) and (Y), with the proviso that each of (X), (Y), and (Z) has a viscosity of less than about 100 cps at 25° C.;

such that the mixture formed from 1) and 2) has a bromine content of at least 40 wt %, a viscosity at 25° C. of about 20,000 cps or less and an acid number as determined by aqueous sodium hydroxide titration and expressed in terms of potassium hydroxide, of less than about 0.5 milligrams of KOH per gram of undiluted product formulation.

In the various embodiments referred to above, the viscosity at 25° C. is preferably about 15,000 cps or less, more preferably about 10,000 cps or less, and still more preferably about 6000 cps or less. In the embodiments wherein at least one of the above referred to mono- or polyhalohydrocarbons and/or at least one of the above referred to mono- or polyhalocarbons is utilized in the process, the viscosity at 25° C. is most preferably about 4000 cps or less. In each of the above referred to embodiments, the bromine content is preferably above about 43 wt %.

The flame retardant compositions produced by the above processes of this invention are themselves new compositions of matter. Also, it is possible to prepare certain new compounds by use of a suitable process of this invention.

These and other embodiments and features of this invention will be still further apparent from the ensuing description and appended claims.

FURTHER DETAILED DESCRIPTION OF THE INVENTION

Figure 1:
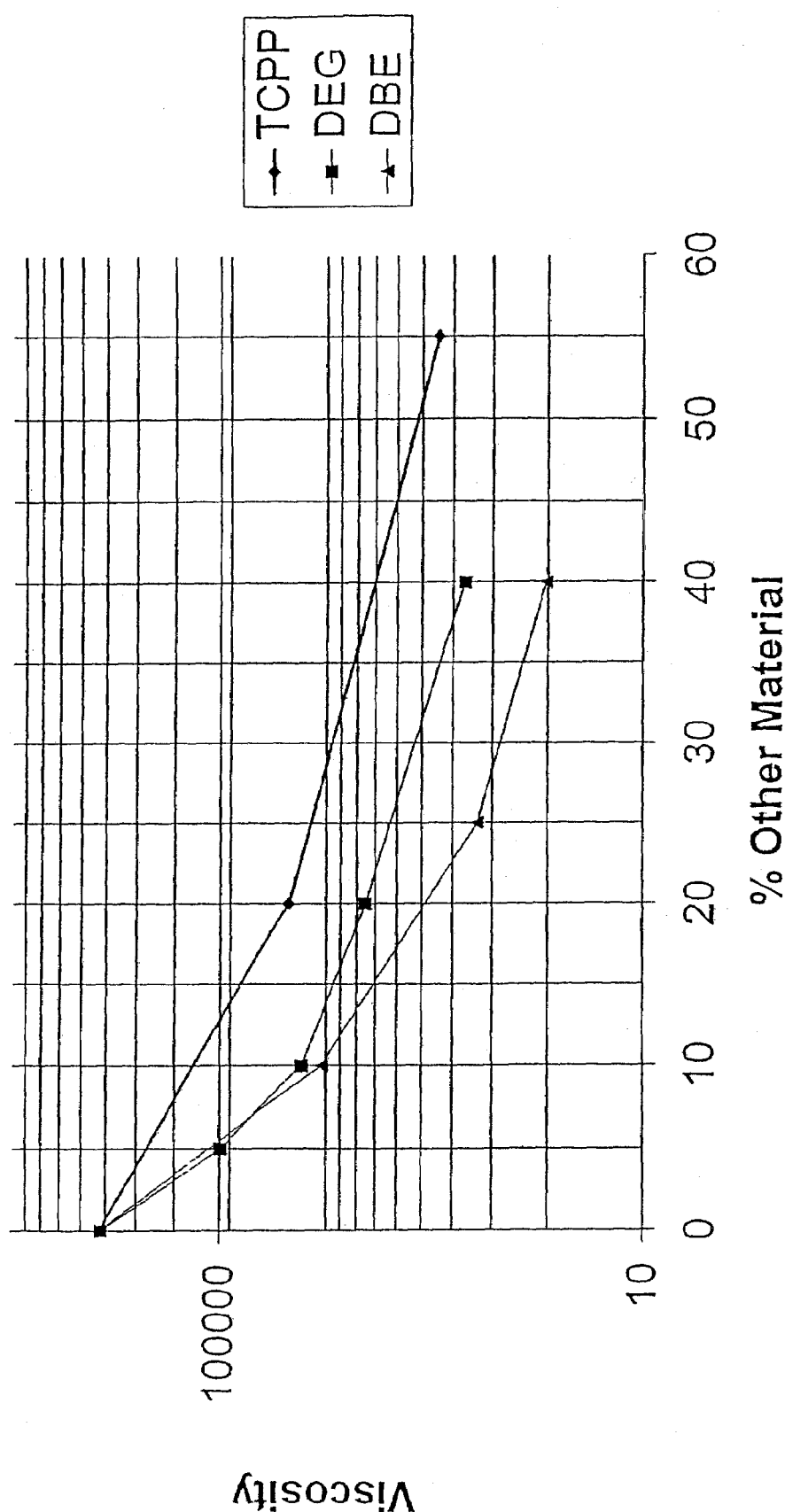
FIG. 1 is a graph on a logarithmic scale of viscosity measurements at 25° C. of three different compositions, one of which is a composition of this invention, the others each being a typical prior art composition.

It will be recalled that one of the processes of this invention for producing a flame retardant formulation comprised of at least one bromine-containing polyol is a process which comprises:

A) heating a mixture formed from components comprised of (i) tetrabromophthalic anhydride, (ii) at least one aliphatic polyol, and (iii) at least one liquid straight chain aliphatic diester of a straight-chain alkane dicarboxylic acid to form an intermediate composition; and B) contacting all or a portion of the intermediate composition one or more times with (iv) at least one alkylene oxide that results in the formation of a liquid product formulation, and optionally, removing any excess alkylene oxide present;

the amounts of (i), (ii), (iii), and (iv) used being proportioned to form a formulation having a bromine content of at least about 40 wt %, a viscosity at 25° C. of about 20,000 cps or less, and an acid number as determinable by aqueous sodium hydroxide titration and expressed in terms of potassium hydroxide, of less than about 1 milligram of KOH per gram of the formulation.

In conducting the above process, a mixture formed from at least the components referred to in A) above, is heated to a temperature that forms an intermediate composition by virtue of the occurrence of at least one chemical reaction. While the temperatures can vary depending on the makeup of the component mixture, ordinarily the mixture will be heated at one or more temperatures in the range of about 50 to about 200° C. and preferably in the range of about 80 to about 160° C., and more preferably in the range of about 100 to about 130° C. The period during which the heating takes place also can vary to a considerable extent depending upon the temperature(s) used. Generally speaking, the higher the temperature the shorter may be the reaction time heat is applied. Typically, the reaction time at temperatures in the above ranges will be between about 10 and about 48 hours and preferably will be between about 16 and about 30 hours. It will be appreciated that departures from the above ranges of temperature and time are permissible and within the scope of this invention provided that the appropriate reaction takes place such that the desired intermediate is formed. Generally speaking, the pressure at which the reaction takes place is not critical and thus the reaction may be conducted at about atmospheric pressure or at suitable pressures above or below atmospheric pressure.

Component (ii) used in forming the mixture is at least one aliphatic polyol. Generally speaking, aliphatic polyols containing in the range of 2 to about 6 hydroxyl groups, and preferably in the range of 2 to about 4 hydroxyl groups, in the range of about 2 to about 18 carbon atoms, and in the range of 0 to about 9 ether oxygen atoms in the molecule can be effectively utilized in conducting step A) above. A few non-limiting examples of such aliphatic polyols include ethylene glycol, propylene glycol, the isomeric butylene glycols, diethylene glycol, 1,5-pentanediol, 1,6-hexanediol, triethylene glycol, glycerol, trimethylolethane, trimethylolpropane, 1,2,6-hexanetriol, pentaerythritol, tetraethylene glycol, dipentaerythritol, sorbitol, sucrose, and alpha-methylglycoside. Mixtures of two or more such aliphatic polyols can be used if desired. A particularly preferred aliphatic polyol is diethylene glycol. Typically, the aliphatic polyol(s) used will contain up to about 18 carbon atoms per molecule.

Component (iii) used in forming the mixture in step A) above is at least one liquid straight-chain aliphatic diester of a straight-chain aliphatic dicarboxylic acid. Typically such esters are those represented by the formula

wherein R is a straight-chain alkylene group (—R—) having up to about 10 carbon atoms and preferably in the range of about 2 to about 6 carbon atoms, and $R_1$ and $R_2$ are independently straight-chain or branched-chain alkyl or straight-chain or branched-chain alkenyl groups, each containing up to about 10 carbon atoms. Preferably $R_1$ and $R_2$ are identical and are straight-chain or branched alkyl groups containing 1 to about 4 carbon atoms each. Preferred esters for use as component (iii) are dimethyl succinate, dimethyl glutarate, or dimethyl adipate, or mixtures thereof.

Any method of bringing components (i), (ii), and (iii) together can be used to form the mixture thereof. Thus, (i) can be added to (ii) followed by addition of (iii) or (ii) can be added to (i) followed by addition of (iii). Also, (i) can be added to (iii) followed by addition of (ii) or (ii) can be added to (iii) followed by addition of (i). Similarly, (iii) can be added to (i) followed by addition of (ii) or (iii) can be added to (ii) followed by addition of (i). In addition any two of (i), (ii), and (iii) can be concurrently added to the other of (i), (ii), and (iii) or all three of (i), (ii), and (iii) can be added at the same time to a container or other mixing vessel.

In conducting step B) all or a portion of the intermediate composition formed in A) is contacted one or more times with (iv) one alkylene oxide so that a liquid product formulation is formed. Normally, the alkylene oxide will be contacted with all or substantially all of the intermediate composition, "substantially" referring to the fact that some of the intermediate composition may adhere to the walls of the vessel from which it is poured or otherwise removed or may drop on the floor or some other surface. However, a portion of the intermediate composition formed in A) may be put to some other use and this is of course within the scope of this invention since not all of the intermediate product need be used in step B).

The contacting in step B) can be effected by adding the alkylene oxide to the intermediate composition or by adding the intermediate composition to the alkylene oxide. Alternatively, the alkylene oxide and the intermediate composition may be concurrently introduced into a suitable vessel. The temperature at which this contacting occurs will typically be in the range of about 90 to about 160° C. and preferably in the range of about 110 to about 140° C. This operation can be conducted at atmospheric pressure or at suitable pressures above or below atmospheric pressure.

As noted above, (i), (ii), (iii), and (iv) are proportioned to form a formulation having a bromine content of at least about 40 wt %, a viscosity at 25° C. of 20,000 cps or less, and an acid number as determinable by aqueous sodium hydroxide titration and expressed in terms of potassium hydroxide, of less than about 1 milligram of KOH per gram of the formulation. Thus, in conducting step A) the relative proportions among (i), (ii), and (iii) can be varied. Generally speaking, when (ii) is a diol, the (i):(ii):(iv) mole ratio will typically fall within the range of about 1:1.1:1.3 to about 1:1.6:1.8 and preferably within the range of about 1:1.2:1.4 to about 1:1.4:1.6. The weight ratio of (iii) to (i) will be in the range of about 3 to about 20 wt %, and preferably in the range of about 5 to about 15 wt %, and more preferably in the range of about 7 to 11 wt %.

Producing New Compounds Pursuant to the Invention

As noted above, new compounds can be prepared by the practice of this invention. In particular, these compounds are prepared from A) tetrabromophthalic anhydride; B) diethylene glycol; C) at least one alpha-omega alkane diol, or at least one alpha-omega alkane diol and at least one aliphatic monool; and D) at least one alkylene oxide; with the proviso that the compounds have a viscosity at 25° C. of about 60,000 cps or less, preferably about 40,000 cps or less, more preferably about 25,000 cps or less, and a bromine content of at least about 43 wt % and preferably above about 45 wt %.

The above new compounds are typically formed by a two-step reaction. In the first step, (i) tetrabromophthalic anhydride, and (ii) diethylene glycol, (iii) at least one alpha-omega alkane diol, or at least one alpha-omega alkane diol and at least one aliphatic monool; are brought together in proportions of about 0.1 to about 1.1 moles of (ii) per mole of (i), and about 0.1 to about 1.1 moles of (iii) per mole of (i) such that there is a total of about 0.5 to about 1.8 moles of (ii) and (iii) per mole of (i). In this connection, when a combination of at least one alpha-omega alkane diol and at least one aliphatic monool is used as (iii), the alpha-omega alkane diol(s) and the aliphatic monool(s) can be used in any proportions relative to each other. This first-step reaction is typically performed at about atmospheric pressure and at a temperature in the range of about 110° C. to about 140° C., and preferably in the range of about 120 to about 130° C.

Various alpha-omega alkane diols can be used in conducting this first step reaction. Thus, use can be made of such alkane diols as 1,2-ethanediol, 1,3-propanediol, 1,4-butanediol, 1,5-pentanediol, 1,6-hexanediol, 1,7-heptanediol, 1,8-octanediol, and their higher homologs. Preferably the alpha-omega alkane diol(s) used will contain in the range of 2 to about 8 carbon atoms per molecule, and more preferably in the range of 2 to about 4 carbon atoms per molecule.

If one or more aliphatic monools are used in the first-step reaction, the aliphatic monool can be straight-chain or branched-chain and they can be saturated or unsaturated, and if unsaturated, preferably, olefinically unsaturated. In addition aliphatic portion of the monools can contain one or more ether oxygen atoms. Non-limiting examples of such aliphatic monools include methanol, ethanol, 1-propanol, 2-propanol, 1-butanol, 2-butanol, 2-methyl-1-propanol, 2-methyl-2-propanol, 2-methyoxyethanol, 2-ethoxyethanol, diethylene glycol monomethylether, allyl alcohol, 3-butenol, 1-hexanol, 2-ethylhexanol, isodecyl alcohol, and the like. Typically, the aliphatic monool will contain in the range of 1 to about 10 carbon atoms per molecule. Preferably the aliphatic monool(s) used will contain in the range of 1 to about 4 carbon atoms per molecule.

In the second step, the product of the above reaction is contacted with at least one alkylene oxide. For the purposes of this invention, and unless expressly specified otherwise, the term "alkylene oxide" includes haloalkylene oxides. Thus, use can be made of such alkylene oxides as ethylene oxide, propylene oxide, epichlorohydrin, epibromohydrin, 1,2-butylene oxide, 2,3-butylene oxide, 1,2-epoxypentane, 2,3-epoxypentane, 1,2-epoxyhexane, 2,3-epoxyhexane, 3,4-epoxyhexane, and their higher homologs. Mixtures of two or more such alkylene oxides can be employed if desired. The alkylene oxide(s) used will typically contain in the range of 2 to about 10 carbon atoms per molecule. Preferred alkylene oxides will contain in the range of 2 to about 4 carbon atoms per molecule. The proportions used are such that there are in the range of about 1.2 to about 1.9 moles of one or more alkylene oxides per mole of tetrabromophthalic anhydride used in the first step reaction, and such that the acid number (as determined by aqueous sodium hydroxide titration and as expressed in terms of potassium hydroxide) is less than 0.4 and preferably less than 0.2 milligrams of KOH per gram of undiluted product. This second step reaction is typically conducted at a temperature in the range of about 110 to about 140° C., and preferably in the range of about 120 to about 130° C. under pressures in the range of about 10 to about 100 psig, and preferably in the range of about 20 to about 50 psig.

In selecting the alpha-omega alkane diol and, if used the aliphatic monool, the molecular weight of such compound(s) and the proportion thereof used in the reaction tend to be inversely proportional. For example, when using one or more higher molecular weight alpha-omega alkane diols alone as reactant (iii) above the proportion thereof should be kept relatively low within the above specified ranges in order to ensure that the final product will meet the bromine content parameter. Similar considerations apply when using one or more higher molecular weight aliphatic monools along with one or more higher molecular weight alpha-omega alkane diols.

Although typically unnecessary, either or both of the foregoing two step reactions can be conducted in the presence of an inert solvent such as an inert liquid hydrocarbon. However, if such a hydrocarbon solvent is used, it is desirable to remove the solvent such as by flashing or distillation upon completion of the reaction.

Preparation of a First Group of New Formulations

By use of an appropriate process of this invention, a first group of new flame retardant formulations can be formed. These are comprised of (1) at least one bromine-containing polyol flame retardant made from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

The aliphatic ester groups of component (2) above, which can be the same or different, are $C_{1-10}$ aliphatic groups which can be straight-chain or branched-chain. Also, these aliphatic groups can be saturated or they can be unsaturated, especially with one or more olefinic bonds. Use of esters having straight-chain aliphatic ester groups is preferred, and more preferred are esters having straight-chain alkyl ester groups. While the alkane moiety can contain up to 10 carbon atoms, dialiphatic esters of $C_2$ to $C_6$ saturated dicarboxylic acids are preferred. A particularly preferred group of fully saturated straight-chain dicarboxylic acid esters is composed of a single ester or a combination of esters represented by the formula:

$$R^2\text{---}OOC\text{---}R^1\text{---}COO\text{---}R^3$$

wherein $R^1$ is $\text{---}(CH_2)_w\text{---}$; $R^2$ is $\text{---}(CH_2)_x\text{---}CH_3$; and $R^3$ is $\text{---}(CH_2)_y\text{---}CH_3$; and in which w is a number from 2 to 4, and each of x and y is, independently, a number from 0 to 4. More preferred is a single ester or a combination of esters of this formula where $R^2$ and $R^3$ are methyl, ethyl, n-propyl, n-butyl, or isobutyl and especially where such $C_{1-4}$ alkyl groups are the same. Even more preferred are the dimethyl esters of succinic acid or glutaric acid or adipic acid, or any mixture of any two or all three of these.

The polyol flame retardants of (1) can be made from a variety of aliphatic polyols and epoxides. Among suitable aliphatic polyols are included, for example, ethylene glycol, propylene glycol, the isomeric butylene glycols, diethylene glycol, 1,5-pentanediol, 1,6-hexanediol, triethylene glycol, glycerol, trimethylolethane, trimethylolpropane, 1,2,6-hexanetriol, pentaerythritol, tetraethylene glycol, dipentaerythritol, sorbitol, sucrose, and alpha-methylglycoside. Mixtures of two or more such aliphatic polyols can be used if desired. Typically, the aliphatic polyol(s) used will contain up to about 18 carbon atoms per molecule.

Non-limiting examples of epoxides that can be used in the production of the polyol flame retardants of (1) include ethylene oxide, propylene oxide, epichlorohydrin, epibromohydrin, 1,2-butylene oxide, 2,3-butylene oxide, 1,2-pentylene oxide, 2,3-pentylene oxide, and any of the several hexylene oxides, heptylene oxides, octylene oxides, 1,2-epoxy dodecane, styrene oxide, and the like. Mixtures of two or more such epoxides can be used. Typically the epoxide(s) used can contain up to about 12 carbon atoms per molecule.

In preparing the polyol flame retardants of (1) a two step reaction is typically employed. In the first step, the tetrabromophthalic anhydride is reacted with the aliphatic polyol. A suitable catalyst is introduced into the reaction mixture. Among suitable catalysts are, for example, magnesium oxide, sodium acetate, potassium acetate, sodium carbonate, and potassium carbonate. Trialkylamines are also suitable catalysts. If desired, an inert solvent such as an inert liquid hydrocarbon can be employed in the first step. In the second step, the epoxide or mixture of epoxides is introduced into the reaction product mixture formed in the first step.

In forming the polyol flame retardants of (1) various ratios of the reactants can be used. Typically these ratios are expressed in terms of equivalents. An equivalent weight of tetrabromophthalic anhydride is one-half of its molecular weight. An equivalent weight of an aliphatic polyol is its molecular weight divided by the number of reactive hydroxyl groups. An equivalent weight of a monoepoxide is one-half its molecular weight. A typical reactant ratio is one equivalent of tetrabromophthalic anhydride to 0.5-10 equivalents of aliphatic polyol to 0.5-20 equivalents of epoxide. A more preferred reactant ratio is one equivalent of tetrabromophthalic anhydride to 0.75-2.0 equivalents of polyol to 1-10 equivalents of epoxide. Most preferred ratios are one equivalent of tetrabromophthalic anhydride with 0.9-1.5 equivalents of aliphatic polyol and 1-5 equivalents of epoxide.

Temperatures used in the two steps of the reaction will typically fall within the range of about 100 to about 150° C.

Further details concerning the preparation of polyol flame retardants of (1) can be found, for example, in U.S. Pat. Nos. 3,455,886; 4,144,395; 4,564,697; and 5,332,859.

The other component used in preparing this first group of new formulations is at least one liquid straight-chain aliphatic diester of a straight-chain alkane dicarboxylic acid. Non-limiting examples of such diesters include dimethyloxalate, diethyloxalate, di-n-propyloxalate, di-n-butyloxalate, diisopropyloxalate, diisobutyloxalate, dipentyloxalate, methylethyloxalate, methylbutyloxalate, dimethylmalonate, diethylmalonate, di-n-propylmalonate, di-n-butylmalonate, diisopropylmalonate, diisobutylmalonate, dipentylmalonate, methylethylmalonate, methylbutylmalonate, dimethylsuccinate, diethylsuccinate, di-n-propylsuccinate, di-n-butylsuccinate, diisopropylsuccinate, diisobutylsuccinate, dipentylsuccinate, methylethylsuccinate, methylbutylsuccinate, dimethylglutarate, diethylglutarate, di-n-propylglutarate, di-n-butylglutarate, diisopropylglutarate, diisobutylglutarate, dipentylglutarate, methylethylglutarate, methylbutylglutarate, dimethyladipate, diethyladipate, di-n-propyladipate, di-n-butyladipate, diisopropyladipate, diis obutyladipate, dipentyladipate, methylethyladipate, methylbutyladipate, and analogous liquid straight-chain aliphatic diesters of straight-chain alkane dicarboxylic acids. Preferred as component of (2) of this embodiment are mixtures of such esters, especially mixtures of dimethyl esters. A few non-limiting examples of such preferred mixtures include 55-65 wt % of dimethylglutarate, 10-25 wt % of dimethyladipate, and 15-25% wt % of dimethylsuccinate; 72-77 wt % of dimethylglutarate and 20-28 wt % of dimethyladipate; 85-95 wt % of dimethyladipate and 5-15 wt % of dimethylglutarate; 65-69 wt % of dimethylglutarate and 31-35 wt % of dimethylsuccinate; 55-70 wt % of diisobutylglutarate, 10-20 wt % of diisobutyladipate, and 20-30 wt % of diisobutylsuccinate. Mixtures of this type are available as articles of commerce from DuPont Company.

The amount of component (2) used with component (1) is an amount sufficient to reduce the viscosity of the resultant formulation to a suitably low level of about 20,000 cps or less at 25° C. while maintaining the bromine content of the formulation at a level of at least about 40 wt %. Preferably the resultant formulation has a viscosity of about 15,000 cps or less, more preferably about 10,000 cps or less, and most preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

To form the formulations suitable mixing equipment such as a stirred tank should be used. Preferably, the mixing is conducted with agitation under an inert atmosphere such as nitrogen and with the application of thermal energy sufficient to raise the temperature of the mixture being formed to about 50 to about 100° C. The order of addition of the components is not critical and thus either component can be introduced into the mixing equipment before the other, or both components can be introduced concurrently into the mixing equipment. The time used in the mixing step and the rate of agitation should be sufficient to produce a homogeneous formulation.

Preparation of a Second Group of New Formulations

A second group of new flame retardant formulations that can be produced by an appropriate process of this invention is comprised of (1) at least one bromine-containing diol formed from (a) tetrabromophthalic anhydride; (b) diethylene glycol; (c) at least one alpha-omega alkane diol, or at least one alpha-omega alkane diol and at least one aliphatic monool; and (d) at least one alkylene oxide; and (2) at least one straight-chain aliphatic diester of a straight-chain alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

The procedure and materials used in forming this second group of new formulations are as described in connection with the above first group of formulations except that component (1) is one or a mixture of the new compounds of this invention described at the outset hereinabove. In addition, while the formulation can be formed by blending the specified components after formation of component (1), it is desirable to utilize component (2) as an inert solvent for the preparation of the new compound or mixture of new compounds so that the resultant end product from the process already contains the desired component (2). Thus, the amount of component (2) used as a solvent can be adjusted relative to the reactants used in forming the new compound(s) referred to above such that the proportions of components (1) and (2) in the finished product correspond to the desired proportions of the formulation. On the other hand, the amount of component (2) used as a solvent in the preparation of the above referred to new compound(s) can be less than that desired in the resultant formulation. In this case, an additional quantity of component (2) should be added to the product formed in the process to bring the level of component (2) in the resultant formulation up to the desired proportion.

Conversely, in preparing the above referred to new compound(s), an excess amount of component (2) can be used as a solvent for the reaction producing the new compound(s) whereby the resultant reaction product will contain more of component (2) relative to component (1) than desired. In this case such excess of component (2) can be removed from the resultant reaction product by reduced pressure distillation so that the finished product contains the desired amount of component (2) relative to component (1).

Preparation of a Third Group of New Formulations

A particularly preferred third group of formulations is as above described in connection with the above first group of new formulations or the above second group of new formulations with which is blended (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of less than 100 cps at 25° C. These formulations typically have a viscosity at 25° C. of about 20,000 cps or less, preferably about 10,000 cps or less, more preferably about 6000 cps or less, and still more preferably about 4000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

This third group of formulations constitutes a preferred group of formulations. Non-limiting examples of liquid monohalohydrocarbons and polyhalohydrocarbons that can be used in forming the third group of formulations include n-propyl chloride, n-propyl bromide, isopropyl chloride, isopropyl bromide, butyl chloride, butyl bromide, isobutyl chloride, isobutyl bromide, higher homologs of these alkyl monohalides, methylene chloride, bromochloromethane, methylene bromide, ethylene dichloride, ethylene dibromide, 1,1,2-trichloroethane, 1,1,1 -trichloroethane, trichloroethylene, chloroform, chlorobenzene, bromobenzene, cyclohexylchloride, cyclohexylbromide, and analogous halohydrocarbons in which the halogen content is either chlorine or bromine, or both. Non-limiting examples of polyhalocarbons that can be used include carbon tetrachloride, carbon tetrabromide, perchloroethylene, and the like. The liquid monohalohydrocarbons and polyhalohydrocarbons that are devoid of unsaturation are preferred.

The amount of liquid mono- or polyhalohydrocarbon(s) and/or liquid polyhalocarbon(s) used in forming this particularly preferred third group of formulations can be varied so long as the viscosity of the resultant formulation is about 20,000 cps or less and the bromine content of the resultant formulation is at least about 40 wt %. Generally speaking, the requisite amount of liquid mono- or polyhalohydrocarbon(s) and/or liquid polyhalocarbon(s) will typically fall within the range of about 0.1 to about 15 wt % based on the total weight of the formulation. However, departures from this range are permissible whenever deemed necessary or advisable in achieving the desired viscosity and bromine content parameters, and are within the contemplation and scope of this invention.

The blending procedures, mixing equipment, and conditions for the mixing or blending (including temperatures) are the same as described above.

Use of the Formulations

As noted above, the formulations produced by the processes of this invention are well suited for use as flame retardants in the production of polyurethanes and polyisocyanurates, and especially polyurethane foams and polyisocyanurate foams, both rigid and flexible. The polyurethanes and polyisocyanurates, the foams thereof, and methods of preparing such polymers are very well known in the art and are reported in the literature. See, for example, *Encyclopedia of Polymer Science and Technology*, vol. 11, pgs. 506-563 (1969 Wiley & Sons) and vol. 15, pp. 445-479 (1971 Wiley & Sons), and exemplary U.S. Pat. Nos. 3,974,109; 4,209,609; 4,405,725; 4,468,481; 4,468,482; and 5,102,923, the disclosures of which relating to polyurethanes, polyisocyanurates, and/or methods for their preparation are incorporated herein by reference as if such disclosures are fully set forth herein. The formulations of this invention can be employed in flame retardant quantities in conducting any known procedure for forming such polymers. Typically, the formulation will be included as one of various additives employed in the polymer formation process and will be employed using typical polymer formation conditions. It is also typical that the flame retardant quantities will fall in the range of about 1 to about 20 wt % of a formulation of this invention based on the total weight of the polyurethane or polyisocyanurate composition.

The following Examples illustrate the invention and are not intended to limit the invention only to the subject matter specifically described therein. In all of the following examples, acid number determinations were conducted by dissolving a weighed amount of the sample in a solution composed of 50% isopropanol, 2% water and 48% toluene by volume. To this mixture was added 4 to 6 drops of a 1% phenolphthalein indicator solution and the titration was carried out to the light pink end point with aqueous 0.1 N NaOH solution. The acid number (AN) was calculated according to the following equation: AN=(Normality of NaOH solution x volume of NaOH solution used X 56.1)/sample weight.

Hydroxyl number determinations in the following examples were conducted by determining the sample size according to the following formula: sample wt (g)=561/[expected OH number]. The desired amount of sample was then weighed carefully into a flask by difference. To the flask was also weighed an amount of phthalation reagent (prepared advance using only reagent grade chemicals by dissolving 111-116 grams phthalic anhydride and 16-18 grams imidazole in 700 mL pyridine then the mixture is stirred and left standing 12 hours before using) and the weight recorded. The flask is carefully placed in an oil bath that has been preheated to 100-110 degrees C. The flask is swirled carefully after about 5 minutes to make certain all of the sample is dissolved. The sample solution is left in the bath a minimum of 30 minutes. The flask is removed from the oil bath and placed in an ice water bath for 5 minutes or more to cool. If the titration cannot be done quickly, the flask is closed with a clean stopper and placed in a freezer. Distilled water (10 mL) is added to the flask from small repipet and swirled to mix. The mixture is left standing for 2 minutes. Phenolphthalein solution (1%, 5 to 6 drops) is added to the flask. A pH meter is standardized with the appropriate buffers. The flask is placed on a magnetic stirrer and titrated with 0.5 N NaOH to a pink endpoint. The pH is measured at endpoint and the volume of titrant used is recorded. A blank is prepared in the same manner as above with the exception that no sample is added to the respective flask. The hydroxyl number (HN) is calculated according to the following equation: HN=((volume of 0.5N NaOH solution used for sample−volume of 0.5N NaOH solution used for blank)×normality of NaOH solution×56.1)/sample weight.

The weight percent bromine in the products of following examples was determined by use of an x-ray fluorescence spectrometer.

Examples 1 and 2 each illustrate the formation of a formulation of this invention in which, pursuant to this invention, a flame retardant polyol is produced in a viscosity-reducing quantity of an aliphatic diester of an alkane dicarboxylic acid.

EXAMPLE 1

Diethylene glycol (415 g), a mixture of dimethylglutarate, dimethyl adipate, and dimethyl succinate (DBE dibasic ester with a specification of 10-25 wt % of dimethyl adipate, 55-65 wt % of dimethylglutarate, and 15-25 wt % of dimethylsuccinate; DuPont) (250 g) and $Na_2CO_3$ (3.6 g) were charged to a 2 L reactor and heated to 120 to 130° C. Prior to the first tetrabromophthalic anhydride addition, some distillate was noted to have been collected in the reactor overhead. This material was added back to the reactor but a large portion flashed out through the open reactor port. Tetrabromophthalic anhydride (1800 g) was then added in 4 equal portions in 15-minute intervals. Additional flashing was noted during the first tetrabromophthalic anhydride addition. The mixture was allowed to stir for 1 hour at 130° C. then 320 g of propylene oxide was added over a 1 hour and 20 minute period. A sample was taken for the acid number determination and the value was estimated to be about 6.7. An additional 43 g of propylene oxide were added and the mixture stirred for 30 minutes at which time the acid number was found to be about 0.68. A further 15 g of propylene oxide were added and the mixture was cooked for 1 hour. A vacuum of about 185 mm Hg was then applied to the mixture. The mixture was stirred under those conditions for about 10 minutes and the vacuum was released. A total of 10 g of liquid had been collected in the reactor overhead. DBE dibasic ester (20 g) was added to the hot product with stirring to replace the distillate and estimated amount of flashed material. The finished product was then drained into bottles and analyzed. The results of the analyses are summarized in Table 1.

TABLE 1

| Property | Result |
| --- | --- |
| Viscosity (cps at 25° C.) | 34,500 |
| Bromine (wt %) | 45% |
| Hydroxyl number | 130 |
| Acid number (mg KOH/g) | 0.33 |

EXAMPLE 2

Diethylene glycol (495 g), DBE dibasic ester (DuPont) (290 g) and $Na_2CO_3$ (3.6 g) were charged to a 2 L reactor along with 900 g of RB-49 addition. The mixture was heated to 130° C. and the solids allowed to dissolve. Once the solids dissolved the remaining tetrabromophthalic anhydride was added and the mixture stirred at 130° C. for 1 hour. Then 370 g of propylene oxide was added over 1 hour. After 2 hours at 130° C., a sample was taken for the acid number determination and the value was estimated to be about 0.3. An additional 17 g of propylene oxide were added and the mixture stirred for 30 minutes at which time the acid number was found to be about 0.17. A vacuum of about 50 mm Hg was then applied to the mixture. The mixture was stirred under those conditions for about 30 minutes and the vacuum was released. A total of 65 g of liquid had been collected in the reactor overhead. DBE (65 g) was added to the hot product with stirring to replace the distillate and estimated amount of flashed material. The finished product was then drained into bottles and analyzed. The results of these analyses are summarized in Table 2.

TABLE 2

| Property | Result |
| --- | --- |
| Viscosity (cps at 25° C.) | 5,927 |
| Bromine (wt %) | 42.5% |
| Hydroxyl number | 171 |
| Acid number (mg KOH/g) | 0.04 |

Examples 3 and 4 each illustrate the formation of formulations in which, pursuant to this invention, a new flame retardant compound is produced in a viscosity-reducing quantity of an aliphatic diester of an alkane dicarboxylic acid, thereby providing a new composition by the practice of process technology of this invention.

EXAMPLE 3

Diethylene glycol (144 g), DBE dibasic ester (DuPont) (195 g), 1,4-butanediol (122) and $Na_2CO_3$ (2.5 g) and tetrabromophthalic anhydride (625 g) were charged to a 2 L reactor and heated to 120 to 130° C. After 10 minutes, the reaction mixture cleared and the remaining tetrabromophthalic anhydride (630 g) was added in one portion. The mixture took 10 minutes to clear and was allowed to stir for 0.5 hour at 130° C. Next, 320 g of propylene oxide was added over a 1 hour period. A sample was taken for the acid number determination and the value was estimated to be about 0.15. A vacuum of about 125 mm Hg was then applied to the hot mixture for 10 minutes. A total of 25 g of liquid had been collected in the reactor overhead. DBE (25 g) was added to the hot product with stirring to replace the distillate and estimated amount of flashed material. The finished product was then drained into bottles and analyzed. Table 3 summarizes the results of these analyses.

TABLE 3

| Property | Result |
| --- | --- |
| Viscosity (cps at 25° C.) | 14,600 |
| Bromine (wt %) | 45% |
| Hydroxyl number | 149 |
| Acid number (mg KOH/g) | 0.26 |

EXAMPLE 4

Diethylene glycol (206 g), DBE dibasic ester (DuPont) (300 g), 1,4-butanediol (87 g), 2-methoxyethanol (74 g), $Na_2CO_3$ (3.6 g), and tetrabromophthalic anhydride (900 g) were charged to a 2 L reactor and heated to 120-130° C. After 10 minutes the reaction mixture cleared and additional 900 g of tetrabromophthalic anhydride was added as a single addition. The mixture took about 20 minutes to clear and was allowed to stir for 0.5 hour at 130° C. Next 350 g of propylene oxide was added over a 1 hour period. A sample was taken for the acid number determination and the value was estimated to be about 0.9. An additional 25 g of propylene oxide was added and the mixture stirred for 30 minutes at which time the acid number was estimated to be about 0.5. A vacuum of about 50 mm Hg was then applied to the hot mixture for 20 minutes. A total of 98 g of liquid had been collected in the overhead section of the reactor. DBE (80 g) was added to the hot product with stirring to replace the distillate and estimated amount of flashed material. The finished product was then drained into bottles and analyzed. The results of these analyses are summarized in Table 4.

TABLE 4

| Property | Result |
|---|---|
| Viscosity (cps at 25° C.) | 5,483 |
| Bromine (wt %) | 44.6% |
| Hydroxyl number | 114 |
| Acid number (mg KOH/g) | 0.27 |

Examples 5-8 each illustrate the preparation of various formulations in which, pursuant to this invention, a bromine-containing diol is formulated with a mixture of aliphatic diesters of alkane dicarboxylic acids, thereby providing a new composition by the practice of process technology of this invention.

EXAMPLE 5

Hexane diol (460 g) and KOAc (3.0 g) were charged to a 2 L reactor and heated to 120 to 130° C. Tetrabromophthalic anhydride (1400 g) was added in 4 portions at 15 minute intervals. The mixture was allowed to stir for 0.5 hour at 130° C. Next, 300 g of propylene oxide was added over a 1 hour period. A sample was taken for the acid number determination and the value was estimated to be about 6.9. A further 30 g of propylene oxide were added and after 30 minutes, the acid number was estimated to be about 0.1. The mixture was purged with nitrogen for 1.5 hours. The light brown/tan finished product was then drained into bottles and analyzed. Table 5 summarizes the results of these analyses of this unformulated product.

TABLE 5

| Property | Result |
|---|---|
| Viscosity (cps at 25° C.) | 47,300 |
| Bromine (wt %) | 40.5% |
| Hydroxyl number | 197 |
| Acid number (mg KOH/g) | 0.01 |

EXAMPLE 6

Butane diol (455 g) and Na$_2$CO$_3$ (3.6 g) were charged to a 2 L reactor and heated to 120 to 130° C. Tetrabromophthalic anhydride (1800 g) was added in 4 portions at 15 minute intervals. The mixture was allowed to stir for 0.5 hour at 130° C. Next, 361 g of propylene oxide was added over a 1 hour period. A sample was taken for the acid number determination and the value was estimated to be about 14. A further 102 g of propylene oxide were added and after 30 minutes, the acid number was estimated to be less than 0.2. The light brown/tan finished product was then drained into bottles and analyzed. Table 6 summarizes the results of these analyses of this unformulated product.

TABLE 6

| Property | Result |
|---|---|
| Viscosity (cps at 25° C.) | 23,760 |
| Bromine (wt %) | 47.2% |
| Hydroxyl number | 198 |
| Acid number (mg KOH/g) | 0.12 |

EXAMPLE 7

Butane diol (455 g) and Na$_2$CO$_3$ (3.6 g) were charged to a 2 L reactor and heated to 120 to 130° C. Tetrabromophthalic anhydride (1800 g) was added in 4 portions at 15 minute intervals. The mixture was allowed to stir for 0.5 hour at 130° C. Next, 460 g of butylene oxide was added over a 1 hour period. A sample was taken for the acid number determination and the value was estimated to be about 3.0. A further 50 g of butylene oxide were added and after 30 minutes, the acid number was estimated to be less than 0.2. The light brown/tan finished product was then drained into bottles and analyzed. Table 7 summarizes the results of these analyses of this unformulated product.

TABLE 7

| Property | Result |
|---|---|
| Viscosity (cps at 25° C.) | 22,360 |
| Bromine (wt %) | 45.9% |
| Hydroxyl number | 194 |
| Acid number (mg KOH/g) | 0.11 |

EXAMPLE 8

In these preparations diethylene glycol (DEG) and sodium carbonate were charged to a reactor under a nitrogen atmosphere. The mixture was purged subsurface with nitrogen for 15 minutes and then heated to in the range of 125 to 130° C. Then tetrabromophthalic anhydride (TBPA) was added over a period in the range of 0.5 to 1 hour. The resulting mixture is then stirred for 30 minutes after the tetrabromophthalic anhydride addition is complete. Ethylene oxide (EO) was then added at a rate sufficient to maintain the reaction temperature between 120 and 140° C. When the ethylene oxide addition was complete, the resulting mixture was allowed to stir for 30 minutes and the acid number for the product was determined. If the acid number was greater than 0.2, more ethylene oxide was added, the resulting mixture was held for 30 minutes, and the value was rechecked. This operation was repeated until the acid number was in the desired range, i.e., less than 0.2. Upon attaining the desired acid number, the resultant hot mixture was vacuum stripped for 20-30 minutes. After stripping the resultant mixture, a sample was taken for analysis. In the respective four preparations the molar ratios of the reactants were as shown in Table 8.

TABLE 8

| Preparation No. | TBPA | DEG | EO |
|---|---|---|---|
| 1 | 1 | 1.4 | 1.8 |
| 2 | 1 | 1.6 | 1.9 |

TABLE 8-continued

| Preparation No. | TBPA | DEG | EO |
|---|---|---|---|
| 3 | 1 | 1.5 | 1.9 |
| 4 | 1 | 1.5 | 1.9 |

The properties of the resultant preparations are summarized in Table 9.

TABLE 9

| Preparation No. | Viscosity cps at 25° C. | Acid No. mg KOH/g | Hydroxyl No. | Bromine Wt % |
|---|---|---|---|---|
| 1 | 65,380 | 0.31 | 208 | 46.9% |
| 2 | 27,550 | 0.14 | 247 | 45.6% |
| 3 | 38,920 | 0.04 | 232 | 46.2% |
| 4 | 41,910 | 0.06 | 227 | 46.1% |

Two formulations were prepared using samples of each product made in Examples 5-8, including the four products made in Example 8 for a total of 14 formulations. The formulation procedure involved the placement of the respective sample in a pressure bottle and the addition thereto of 5 wt % DBE dibasic ester (DuPont). The cap and valve were then attached to the pressure bottle, and the sealed bottle placed in an oven at about 60-80° C. When the contents of the bottle were hot, the bottle was shaken to intimately mix the contents. The bottle and contents were allowed to cool to room temperature, and a sample was retrieved from the bottle and placed in a small sample adapter cup maintained in a controlled temperature water jacket at 25° C. A viscosity determination was then made using a Brookfield viscometer to obtain the 5 wt % DBE formulation viscosity. The contents of the pressure bottle were then further diluted with a weighed quantity of DBE dibasic ester (DuPont) to obtain a 10 wt % DBE formulation and the same procedure was repeated in order to obtain a viscosity determination on this more dilute blend. The bromine content for each formulation was calculated by multiplying the bromine content of the sample (as determined in the respective example) by the percentage of the sample in the formulation (i.e., by 0.95 in 5 wt % DBE formulations and by 0.9 in 10 wt % DBE formulations). The viscosity and bromine content of each such sample formulations are summarized in Table 10 below.

TABLE 10

| Ex. | 5 wt % DBE Formulation Viscosity (cps) | 5 wt % DBE Formulation Bromine Content (wt %) | 10 wt % DBE Formulation Viscosity (cps) | 10 wt % DBE Formulation Bromine Content (wt %) |
|---|---|---|---|---|
| 5 | 7750 | 38.5 | 2500 | 36.4% |
| 6 | 5375 | 44.8 | 1875 | 42.5% |
| 7 | 5250 | 43.6 | 1750 | 41.3% |
| 8 (1) | 9250 | 44.5 | 3125 | 42.2% |
| 8 (2) | 6875 | 43.3 | 2000 | 41.0% |
| 8 (3) | 8500 | 43.9 | 2500 | 41.6% |
| 8 (4) | 9250 | 43.8 | 2625 | 41.5% |

It has been found that formulations producible by the practice of this invention, when incorporated into polyurethane or polyisocyanurate foams at loadings substantially equivalent to convention formulations, have flame retardant characteristics which are at least substantially equivalent to previously known formulations while also providing the significant advantages of the reduced viscosity and relatively high bromine content characteristics taught herein. Furthermore, it has been observed that the new flame retardant formulations have higher hydrolytic stability, and impart improved processing characteristics to high-water containing (e.g., greater than about 1 wt % of the resin) foam formulations, as compared to previously known phosphorus-containing formulations.

The following Comparative Example involved two separate preparations of a known diester/ether diol of tetrabromophthalic anhydride having the lowest viscosity that could be made using conventional known technology optimized for producing a low viscosity product. The two preparations were combined and subjected to analysis and physical properties of the combined product were determined.

COMPARATIVE EXAMPLE

In these preparations diethylene glycol (DEG) and sodium carbonate were charged to a reactor under a nitrogen atmosphere. The mixture was purged subsurface with nitrogen for 15 minutes and then heated to in the range of 125 to 130° C. Then tetrabromophthalic anhydride (TBPA) was added over a period in the range of 0.5 to 1 hour. The resulting mixture is then stirred for 30 minutes after the tetrabromophthalic anhydride addition is complete. Propylene oxide (PO) was then added at a rate sufficient to maintain the reaction temperature between 120 and 140° C. When the propylene oxide addition was complete, the resulting mixture was allowed to stir for 30 minutes and the acid number for the product was determined. If the acid number was greater than 0.2, more propylene oxide was added, the resulting mixture was held for 30 minutes, and the value was rechecked. This operation was repeated until the acid number was in the desired range, i.e., less than 0.2. Upon attaining the desired acid number, the resultant hot mixture was vacuum stripped for 20-30 minutes. After stripping the resultant mixture, a sample was taken for analysis. In the respective two preparations the molar ratios of the reactants were as shown in Table 11.

TABLE 11

| Preparation No. | TBPA | DEG | PO |
|---|---|---|---|
| 1 | 1 | 1.6 | 1.8 |
| 2 | 1 | 1.6 | 1.8 |

The properties of the resultant preparations are summarized in Table 12.

TABLE 12

| Preparation No. | Viscosity cps at 25° C. | Acid No. mg KOH/g | Hydroxyl No. | Bromine Wt % |
|---|---|---|---|---|
| 1 and 2 combined | 48,750 | 0.09 | 226 | 44.6 |

Demonstration of the Superiority of New Formulations Formed by Use of Process Technology of This Invention Formulations were prepared in which three series of blends were prepared of a commercial bromine-containing polyol flame retardant (specifically, a diester/ether diol of tetrabromophthalic anhydride). In a first series of such blends, the other material of the blends was tris(chloropropyl)phosphate, a material which is used commercially as a means of reducing the viscosity of the foregoing commercial bromine-containing polyol flame retardant. In a second series of such blends the other material of the blends was diethylene glycol. In the third series of such blends, which illustrate the superiority of a formulation producible by the practice of this invention, the other material of the blends was a mixture of dimethyl esters of several aliphatic dibasic acids. In each series of blends the respective components were mixed in various proportions and the physical properties of these blends were determined. In particular, the procedure involved subjecting SAYTEX® RB-79 flame retardant (Albemarle Corporation) to stripping at reduced pressure to remove all solvent material from the product. To this isolated bromine-containing polyol in a pressure bottle was added a weighed quantity of tris(chloropropyl)phosphate. The cap and valve were then attached to the pressure bottle, and the sealed bottle placed in an oven at about 60-80° C. When the contents of the bottle were hot, the bottle was shaken to intimately mix the contents. The bottle and contents were allowed to cool to room temperature, and a sample was retrieved from the bottle and placed in a small sample adapter cup maintained in a controlled temperature water jacket at 25° C. A viscosity determination was then made using a Brookfield viscometer. The contents of the pressure bottle were then further diluted with a weighed quantity of the tris(chloropropyl)phosphate and the same procedure was repeated in order to obtain a viscosity determination on this more dilute blend. In addition, a viscosity determination was made on the isolated bromine-containing polyol in the absence of any other material. This entire procedure was repeated except that in this case the material used with the isolated bromine-containing polyol was diethylene glycol, and in this case a total of four (4) viscosity determinations were made with blends of different known proportions.

In the third series of blends representative of a composition formed by a process of this invention, the blends tested for viscosity were formed from the isolated bromine-containing polyol and a mixture of dimethylglutarate, dimethyl adipate, and dimethyl succinate (DBE dibasic ester with a specification of 10-25 wt % of dimethyl adipate, 55-65 wt % of dimethylglutarate, and 15-25 wt % of dimethylsuccinate; DuPont). In this case, a total of three viscosity determinations were made with blends of different known proportions.

The results of these respective series of tests are detailed in Table 13, and graphically illustrated in FIG. 1. In Table 13, DuPont DBE is that which more specifically defined in the preceding paragraph.

TABLE 13

| % Additive | First Series (Tris(chloropropyl) phosphate) Viscosity (cps) | Second Series (Diethylene glycol) Viscosity (cps) | Third Series (DuPont DBE) Viscosity (cps) |
| --- | --- | --- | --- |
| 0.00 | 1425000 | 1375000 | 1425000 |
| 5 | — | 96560 | — |
| 10 | — | 16870 | 11000 |
| 20 | 22120 | 4250 | — |
| 25 | — | — | 375 |
| 40 | — | 500 | 83 |
| 55 | 875 | — | — |

It can be seen from FIG. 1 that the practice of this invention resulted in substantially greater viscosity reductions as compared to the other blends, at least one of which is representative of commercial practice.

In the foregoing description of this invention references have been made to bromine-containing diols having a viscosity at 25° C. of about 20,000 cps or less, preferably about 15,000 cps or less, and more preferably about 10,000 cps or less, and still more preferably about 6000 cps or less, and a bromine content of at least about 40 wt % and preferably above about 43 wt %. In the most preferred embodiments the bromine-containing diols have, respectively, a viscosity at 25° C. of 20,000 cps or less, preferably 15,000 cps or less, more preferably 10,000 cps or less, and still more preferably 6000 cps or less, and a bromine content of at least 40 wt % and preferably above 43 wt %.

In addition, reference has been made hereinabove to formulations further comprising (A) at least one liquid mono- or polyhalohydrocarbon in which the halogen content is one or more chlorine and/or bromine atoms per molecule; (B) at least one polyhalocarbon in which the halogen content is made up of chlorine and/or bromine atoms; or (C) both of (A) and (B), with the proviso that each of (A), (B), and (C) has a viscosity of less than about 100 cps at 25° C., which formulations typically have a viscosity at 25° C. of about 20,000 cps or less, preferably about 10,000 cps or less, more preferably about 6000 cps or less, and still more preferably about 4000 cps or less, and a bromine content of at least about 40 wt % and preferably above about 43 wt %. In the most preferred embodiments these formulations have, respectively, a viscosity at 25° C. of 20,000 cps or less, preferably 10,000 cps or less, more preferably 6000 cps or less, and still more preferably 4000 cps or less, and a bromine content of at least 40 wt % and preferably above 43 wt %.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what chemical changes, if any, take place in the resulting mixture or solution, as such changes are the natural result of bringing the specified substances together under the conditions called for pursuant to this disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

All documents referred to herein are incorporated herein by reference in toto as if fully set forth in this document.

This invention is susceptible to considerable variation within the spirit and scope of the appended claims. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A process of producing a flame retardant formulation comprised of at least one bromine-containing polyol, which process comprises:

A) heating a mixture formed from components comprised of (i) tetrabromophthalic anhydride, (ii) at least one aliphatic polyol, and (iii) at least one liquid straight chain aliphatic diester of a straight-chain alkane dicarboxylic acid to form an intermediate composition; and
B) contacting all or a portion of the intermediate composition one or more times with (iv) at least one alkylene oxide that results in the formation of a liquid product formulation, and optionally, removing any excess alkylene oxide present;

the amounts of (i), (ii), (iii), and (iv) used being proportioned to form a formulation having a bromine content of at least about 40 wt %, a viscosity at 25° C. of about 20,000 cps or less, and an acid number as determinable by aqueous sodium hydroxide titration and expressed in terms of potassium hydroxide, of less than about 1 milligram of KOH per gram of the formulation.

2. A process as in claim 1 wherein in B) excess alkylene oxide is removed.

3. A process as in claim 2 wherein said viscosity is about 15,000 cps or less.

4. A process as in claim 2 wherein said viscosity is about 10,000 cps or less.

5. A process as in claim 2 wherein said viscosity is about 6,000 cps or less.

6. A process as in claim 2 wherein said acid number is less than about 0.5 milligram of KOH per gram of the formulation.

7. A process as in claim 2 wherein said acid number is less than about 0.2 milligram of KOH per gram of the formulation.

8. A process as in claim 2 wherein said bromine content is at least about 43 wt %.

9. A process as in claim 2 wherein said viscosity is about 6,000 cps or less; wherein said acid number is less than about 0.2 milligram of KOH per gram of the formulation; and wherein said bromine content is at least about 40 wt %.

10. A process as in claim 2 wherein said viscosity is about 10,000 cps or less; wherein said acid number is less than about 0.2 milligram of KOH per gram of the formulation; and wherein said bromine content is at least about 43 wt %.

11. A process as in claim 2 wherein A) and B) are independently conducted at one or more temperatures in the range of about 80° C. to about 150° C. and wherein B) is conducted at a pressure in the range of about 0 to about 100 psig.

12. A process as in claim 2 wherein A) and B) are conducted at one or more temperatures in the range of about 100° C. to about 140° C. and wherein B) is conducted at a pressure in the range of about 5 to about 50 psig.

13. A process as in claim 2 wherein A) and B) are conducted at one or more temperatures in the range of about 120° C. to about 140° C. and wherein B) is conducted at a pressure in the range of about 10 to about 30 psig.

14. A process as in any of claims 1-13 wherein (ii) is at least one aliphatic diol.

* * * * *